June 24, 1941.  H. D. COLMAN  2,246,667
HYDRAULIC POWER BRAKE
Filed May 8, 1937  4 Sheets-Sheet 1

INVENTOR
Howard D. Colman
BY
ATTORNEYS

June 24, 1941.   H. D. COLMAN   2,246,667
HYDRAULIC POWER BRAKE
Filed May 8, 1937   4 Sheets-Sheet 4

INVENTOR
Howard D. Colman
BY
Parker, Carlson, Pitzner & Hubbard
ATTORNEYS

Patented June 24, 1941

2,246,667

UNITED STATES PATENT OFFICE 2,246,667

HYDRAULIC POWER BRAKE

Howard D. Coleman, Rockford, Ill.

Application May 8, 1937, Serial No. 141,432

7 Claims. (Cl. 60—52)

The present invention relates to hydraulic power brakes and has particular reference to a new and improved brake adapted for automotive vehicles.

One of the primary objects of the present invention is to provide a novel hydraulic power brake having a closed liquid system hermetically sealed at all points from the atmosphere.

Another object is to provide a new and improved hydraulic power brake in which all of the movable elements exposed to the brake liquid and to the atmosphere are yieldably connected by means of hermetically sealed rubber bellows or diaphragms to the relatively stationary elements so as to avoid the loss of liquid by leakage and the infiltration of air.

A general object is to provide a novel hydraulic power brake which is simple and inexpensive in construction and efficient and reliable in operation, which is manually controllable with the expenditure of a small force to effect a progressive braking action, and in which the manual control is subjected to a proportionately small hydraulic reaction imparting a "feel" to the operator varying in accordance with the braking pressure.

Still another object is to provide a new and improved hydraulic power brake which is easy to assemble and disassemble and in which all internal parts are readily accessible for inspection, repair and replacement.

A further object is to provide a novel pressure reservoir adapted to contain a varying amount of brake liquid under gas pressure but out of direct contact with the gas.

Other objects reside in various novel elements of the hydraulic power brake such as a new and improved hermetically sealed sump, a bellows piston pump with pressure responsive means for controlling the pump delivery, and a control valve unit automatically operable in response to the pressure of the braking liquid to vary the braking action in accordance with the extent of manual actuation.

Further objects and advantages will become apparent as the description proceeds.

In the accompanying drawings.

Referring more particularly to the drawings, the power brake system, constituting the examplary embodiment of the invention, is adapted particularly for automotive vehicles, such, for example, as automobiles, trucks and busses, and in such application would ordinarily comprise four hydraulically operable wheel brakes 13. It is to be understood, however, that the system is not necessarily limited to such use, and that various elements thereof, although especially suitable in the present environment, may be individually utilized for various other purposes.

Figure 1:
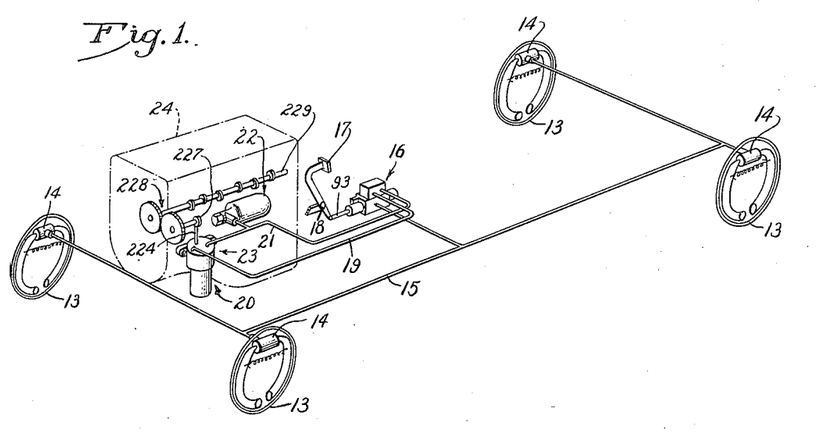
Figure 1 is a perspective view of a power braking system embodying the features of my invention and adapted particularly for automotive vehicles.
Figure 2:
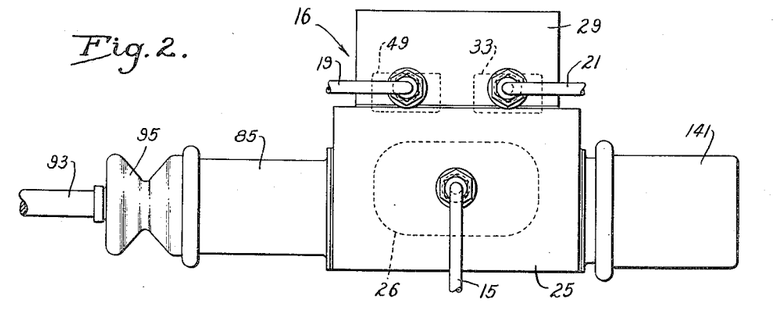
Fig. 2 is a fragmentary side elevational view of a manually operable control unit forming part of the system.

The brakes 13 are provided respectively with hydraulic actuators 14 which may be of any suitable type, such, for example, as disclosed in my copending application Serial No. 127,154, filed February 23, 1937, now Pat. No. 2,193,190, dated March 12, 1940, and which are connected in parallel to a brake liquid supply and relief line 15. Power application of the brakes 13 is under the control of a unit 16 which is operable manually, as by a foot pedal 17 pivoted intermediate its ends at 18, and which is adapted to connect the line 15 either to a relief line 19 leading to a sump 20 for and during brake release, or to a pressure line 21 leading from a suitable source of liquid under pressure for brake application. The unit 16 is also operable automatically during brake application to trap the brake liquid in the line 15 at different pressures corresponding to progressive positions of adjustment of the foot pedal 17, and to impose a resistance to movement of the pedal less than but proportional to the pressure. Hence, the unit 16 has a "follow-up" function permitting application of the brakes 13 with any desired pressure, and imparts a "feel" to the operator whereby the brake pressure, although transmitted from a power source, may be sensed. The pressure source may be an accumulator or reservoir 22 connected to the line 21, and adapted to be kept supplied with brake liquid within a predetermined pressure range by a pump 23 taking liquid from the sump 20. In the present instance, the pump 23 is driven continuously from the vehicle engine, illustrated in dotted outline at 24, and is self-controlled to discharge liquid as required.

The control unit

The control unit 16 (see Figs. 2 to 6) comprises a main body 25 which may be mounted in any suitable position on the vehicle, and which is formed with an internal chamber 26 connected through one wall to the line 15 leading to the various brake actuators 14. The chamber 26 opens to one side of the body 25, and is normally closed by a removable cover plate 27. A gasket 28 is interposed between the body 25 and the plate 27 to provide a tight seal. A valve housing 29 is removably mounted on the body 25, and encloses a normally closed pressure inlet valve 30 for connecting the line 21 to the control chamber 26, and a spring seated relief valve 31 for connecting the chamber through the line 19 to the sump 20. A suitable gasket 32 is interposed between the body 25 and the housing 29 to provide a tight seal.

The pressure valve 30 is operatively mounted in a valve chamber 33 connected to the outlet end of the line 21 (see Fig. 2), and formed in the lower side of the housing 29 for communication through a valve bore or passage 34 in the body 25 with the top of the chamber 26. In its preferred form, the pressure valve 30 comprises an annular valve seat 35 formed in the body 25 at and about the inlet end of the passage 34, and an axially movable valve member 36 normally urged by a coiled compression spring 37 into engagement with the seat.

Figures 3, 4, 5, 6:
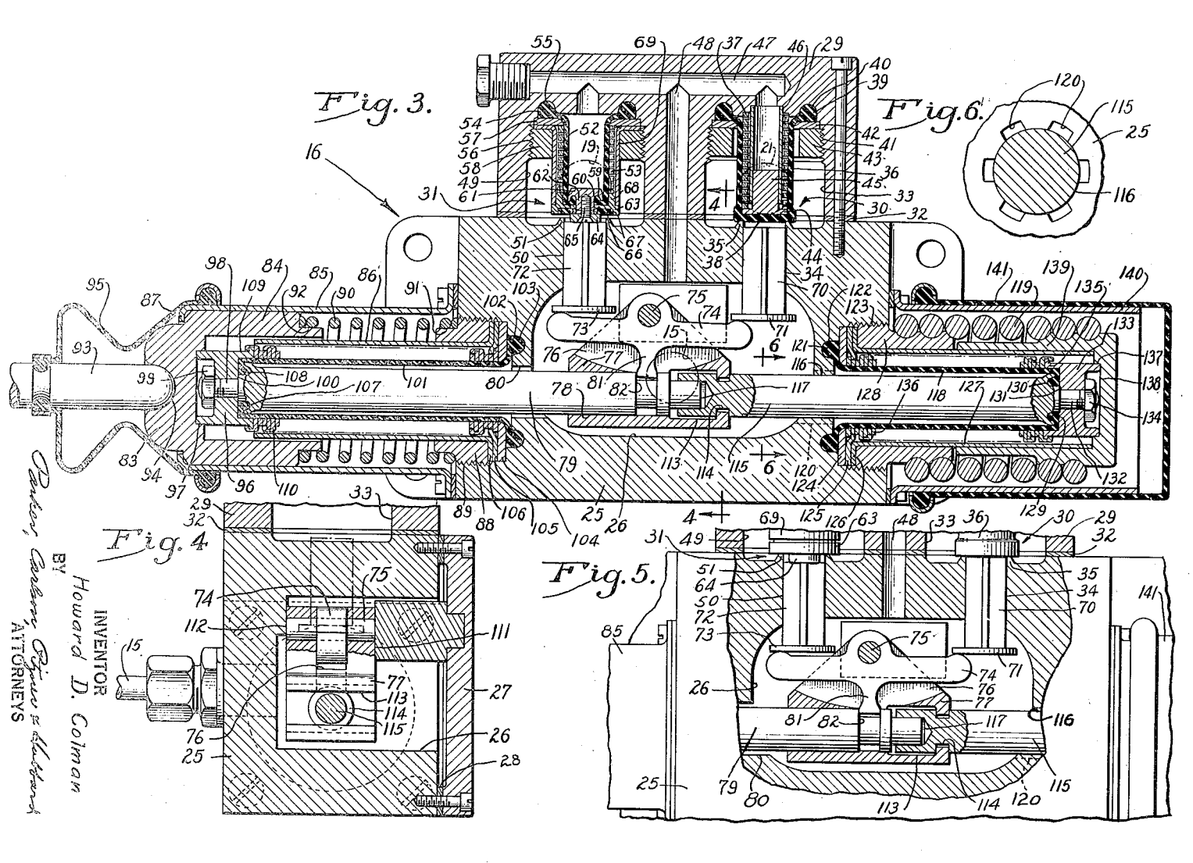
Fig. 3 is a longitudinal vertical sectional view on an enlarged scale of the control unit.
Fig. 4 is a fragmentary transverse sectional view taken substantially along line 4—4 of Fig. 3.
Fig. 5 is a fragmentary side elevational view partially in section in the same plane as Fig. 3, but illustrating the parts in a different position of adjustment.
Fig. 6 is a fragmentary detailed sectional view taken substantially along line 6—6 of Fig. 3.

The valve member 36 consists of a sealed cup, of a suitable yieldable or resilient material, such, for example, as elastic rubber or rubber composition, having a cylindrical or tubular wall supported against radial deformation by external pressure and adapted for axial elongation and contraction, and having a closed end wall defining a yieldable valve face 38. The open end of the cup 36 is connected with a hermetic seal to the valve housing 29, and to this end is formed with an enlarged outer peripheral rib or bead 39 seated in an annular groove 40 in the inner end face of a closed bore 41 opening to the top of the chamber 33. A washer 42 is clamped against the outer edge of the groove 40 by a ring nut 43 threaded into the bore 41 to confine the bead 39 under a heavy deflection pressure. A circular plug 44, with an inner axial stem 45, is seated in the closed end of the cup 36, and serves to reenforce the valve face 38 and to maintain the area thereof substantially constant. The spring 37, which is formed of a square wire, is seated at the upper end against the bottom of the bore 41, and at its other end engages the plug 44 with a predetermined force tending to elongate the cup 36 and thereby to close the valve 30. The spring 37 also serves to reenforce the peripheral wall of the cup 36 against the liquid pressure in the chamber 33. Since the range of axial elongation of the bellows 36 in relation to its length is relatively small, and since the spring 37 is quite stiff, the spring convolutions may be closely spaced, and tend to resist unequal relative displacement, so that the spaces between the convolutions are sufficiently restricted to prevent intrusion of the rubber. Anchored in the housing 29 and extending through the spring 37 into telescoping relation with the stem 45 is a tube 46 which serves to prevent buckling of the spring, and which acts as a stop adapted for engagement by the plug 44 to limit the opening movement of the valve 30.

The cup or valve member 36 in effect constitutes a valve bellows having a constant effective internal end area substantially the same in size as the effective area circumscribed by the valve seat 35. The interior of the cup or bellows 36 is always in free communication with the control chamber 26 through the tube 46 and interconnecting passages 47 and 48 in the valve housing 29 and the body 25, and hence the liquid pressures acting against the inner and outer sides of the movable end wall 38 are substantially equal. The valve member 36 therefore is substantially liquid pressure balanced, and adapted to be lifted by a force sufficient only to overcome the pressure of the spring 37 which, of course, should be adequate to prevent leakage when the valve 30 is closed.

The relief valve 31 is generally similar to the pressure valve 30, and is operatively mounted in a valve chamber 49 connected at one side to the inlet end of the line 19 (see Fig. 2), and formed in the lower side of the housing 29 for communication with the chamber 26 through a valve bore or passage 50 in the body 25. In its preferred form, the exhaust valve 31 comprises an annular valve seat 51 formed in the body 25 at and about the discharge end of the passage 50, and an axially movable valve member 52 normally urged by a coiled compression spring 53 into engagement with the seat. The valve member 52 comprises a sealed cup or valve bellows of a suitably yieldable or resilient material, such, for example, as elastic rubber or rubber composition, having a cylindrical or tubular wall supported against radial deformation by internal pressure and adapted for axial elongation and contraction. The open end of the bellows 52 is connected with a hermetic seal to the valve housing 29 for free communication internally with the bore 47, and to this end is formed with an enlarged peripheral rib or bead 54 which is seated in an annular groove 55 in the end face of a bore 56 opening to the top of the chamber 49 and which is clamped therein under deflection pressure by means of a washer 57 and a ring nut 58.

The movable end of the bellows 52 is provided with an inner peripheral flange in the form of an enlarged rib or bead 59 seated internally in an annular groove 60 in a disk 61 having an axial stem 62. An apertured outer disk 63 slidably interfits with the stem 62, and is secured thereon by means of a washer 64 held in place by a screw bolt 65 to clamp the bead 59 in the groove 60 under deflection pressure. An insert 66 of resilient material, such, for example, as a rubber washer defining a valve face, is secured by the washer 64 in an annular recess 67 in the outer disk 63. The coiled compression spring 53, which is made of square wire turned into closely spaced relatively stiff convolutions, encircles the peripheral wall of the bellows 52 to reenforce the latter against radial enlargement by the internal pressure, and is confined under compression between the washer 57 and an annular flange 68 on the outer disk 63. An external antibuckling tube 69 for the spring 53 is clamped at one end between the washer 57 and the nut 58, and at the other end telescopes slidably with the flange 68 to guide and limit the opening movement of the valve member 52.

The pressure and relief valves 30 and 31 are adapted to be actuated selectively to apply, release or lock the brakes 13 through the medium of a suitable compound mechanism preferably and conveniently located within the control chamber 26. This mechanism is operable by the brake pedal 17 selectively to lift either of the valves 30 and 31, and during brake application is independently operable upon the attainment of a predetermined liquid pressure corresponding to the position of adjustment of the pedal to effect closing of the pressure valve 30 and thereby trapping of the liquid in the brake actuators 14.

The valve actuating mechanism comprises two lifter tappet members 70 and 72 which are slidable respectively in the valve passages 34 and 50 for engagement at their upper or outer ends with the valve face 38 and the washer 64, and which are provided at their lower or inner ends with abutment heads or disks 71 and 73 engaging at their undersides with the upper sides of the rounded ends of a generally horizontal pivotal lever 74. Each of the tappet members 70 and 72 may be constructed of two flat sheet metal plates secured together at right angles by interfitting longitudinal slots to define quadrant vanes permitting an unrestricted flow of liquid, and secured at their inner ends as by means of riveting to the associated head 71 or 73.

The tappet lever 74 is pivotally mounted midway of its ends on a pin 75 within a slot 76 formed in a movable block 77. The arrangement is such that when the lever 74 is disposed in a horizontal or neutral position both valves 30 and 31 will be closed, and when it is oscillated out of neutral position, the valves will alternately be opened and closed respectively. Opening longitudinally to one end of the block 77 and intersecting the arcuate root of the slot 76 is a bore 78. A rod 79 is slidably disposed at one end in the bore 78, and extends loosely through a bore 80 in one end wall of the chamber 26 for operative association with the brake pedal 17. The lever 74 is in the form of a double bell crank having a short depending third arm 81 engaging in a peripheral notch 82 in the inner end of the rod 79. It will be evident that axial movement of the rod 79, with the block 77 stationary, will effect actuation of the valves 30 and 31 to apply or release the brakes 13.

The operative connection between the brake pedal 17 and the rod 79 comprises a cup-shaped member having a closed end wall 83 and having a cylindrical wall 84 slidable in an external cover tube 85 and telescoping loosely with the open end of a concentric internal tube 86. The cover tube 85 is bolted at one end to the body 25 of the control unit 16, and is turned in at the other end to define a stop 87 for limiting the outward movement of the member 83, 84. The inner tube 86 is rigidly secured at one end by an encircling ring nut 88 in a counterbore 89 in the body 26 about the bore 80. A coiled compression spring 90, between the tubes 85 and 86, is seated at one end in a centering notch 91 in the nut 88 and at the other end in a centering notch 92 in the free end of the wall 84, and tends to urge the member 83, 84 outwardly.

A brake rod 93 is suitably connected at one end to the pedal 17, and at the other end is rounded and in engagement with a ball socket 94 in the end wall 83. A sealing bellows 95 attached at opposite ends to the tube 85 and the brake rod 93 serves to exclude the oxygen of the air and solid foreign matter. The spring 90, acting through the member 83, 84 and the rod 93, acts to return the pedal 17 to inoperative position during brake release.

The outer end of the rod 79 extends concentrically through the tube 86, and is rigidly attached to a circular head or disk 96 removably fixed in an interfitting recess 97 in the inner face of the wall 83 for movement therewith. In the present instance, the disk 96 is apertured to receive an axial stud 98 on the rod 79, and is clamped by a suitable nut 99 against an annular shoulder 100 at the base of the stud. A pedal bellows 101 exposed internally to the liquid pressure in the control chamber 26 tends to urge the disk 96 outwardly.

The pedal bellows 101 comprises an elongated cylindrical wall which may be made of any suitable resilient material, such, for example, as rubber or rubber composition, and which is reenforced against diametrical enlargement and is axially extensible and contractible in accordance with the movements of the rod 79. Opposite ends of the bellows 101 are connected with a hermetic seal respectively to the body 25 and the outer end of the rod 79. Preferably, the fixed or inner end of the bellows 101 is formed with an external peripheral flange which is enlarged to provide a thick rib or bead 102, and which is seated in an annular groove 103 in the end of a counterbore 89 concentrically about the bore 80. The bead 102 is clamped in the groove 103 under a heavy deflection pressure by an overlying washer 104 suitably rounded at the inner edge to present a smooth surface to the rubber. An anchor ring 105 and an annular flange 106 on the inner end of the tube 86 are clamped in superimposed relation against the washer 104 by the ring nut 88. The outer or movable end of the bellows 101 is formed with an inner peripheral flange which is enlarged to provide a thick rib or bead 107, and which is clamped under a heavy deflection pressure by the disk 96 in an annular groove 108 formed in the shoulder 100. Preferably, the outer lip of the groove 108 is flared, as in a metal upsetting process, to a diameter greater than that of the rod 79 and serves to confine the end of the bellows wall against the interior of an encircling annular flange 109 on the disk 96.

Interposed between the tube 86 and the bellows wall is a tubular reenforcement 110 substantially rigid diametrically and readily extensible and contractible axially. The reenforcement 110 may be of any suitable construction, and preferably comprises a plurality of axially aligned rings interlocked to limit the extent of axial separation as disclosed in my aforesaid copending application. Opposite ends of the reenforcement 110 are nonrotatably anchored respectively to the spacer ring 105 and the flange 109 on the head 96. The reenforcement 110 is confined against buckling by the tube 86, and serves to support the bellows wall against diametrical enlargement by the internal pressure, and thereby maintain a constant annular bellows piston area about the rod 79 always open through the bore 80 to the liquid pressure in the chamber 26.

The valves 30 and 31 are also adapted to be actuated by the block 77 independently of the brake pedal 17. In the present instance, the block 77 is rectangular in cross section, and is confined at the top against rotation and for close sliding adjustment longitudinally of the rod 79 by two parallel guide surfaces 111 and 112 respectively on the cover plate 27 and the opposed side wall of the control chamber 26 (see Fig. 4). These surfaces serve also to confine the pin 75 within the block 77. One end of the block 77 is formed with a transverse T-slot 113 open to the inner end of the bore 78. The lips of the T-slot 113 engage in an annular groove 114 formed in the inner end portion of a rod 115 axially aligned with the rod 79 and extending slidably with a close fitting through a bore 116 in the adjacent end wall of the chamber 26 for external actuation. Preferably, the inner end of the rod 115 is formed with an axial bore 117 slidably telescoping with an extension of reduced diameter on the inner end of the rod 79. As a result, both rods 79 and 115 are guided laterally by the block 77, and the block and the inner end of the rod 79 are supported by the rod 115. It will be evident that, in any position of adjustment of the rod 79, axial movement of the rod 115 will shift the block 77, and thereby effect oscillation of the lever 74 about the notch 82 as a stationary fulcrum to actuate the valves 30 and 31.

The rod 115 is adjustable by a pressure responsive element 118 acting in opposition to a coiled tension spring 119 to effect movement of the lever 74 into neutral position whenever the brake liquid in the chamber 26 attains a predetermined pressure varying in accordance with the position of the brake pedal 17. In the present instance, the element 118 is in the form of a rubber bellows, appropriately designated as a pressure control bellows, and comprising a cylindrical wall extending in concentrically spaced relation about the outer end portion of the rod 115. The bellows 118 is attached with a hermetic seal at opposite ends respectively to the body 25 of the control unit for internal communication with the control chamber 26 through longitudinal grooves 120 cut in the periphery of the bore 116 (see Fig. 6), and to the outer end of the rod 115 to define an annular internal piston area. The cylindrical wall of the bellows 118 is confined against diametrical enlargement by the liquid pressure so as to maintain the piston area constant, and is axially extensible and contractible in response to the liquid pressure variations.

To provide a suitable seal and anchor, the fixed or inner end of the bellows 118 is formed with a peripheral flange 121 which is enlarged to provide an annular rib or bead, and which is seated in an annular groove 122 in the end wall of a counterbore 123 about the bore 116. The flange 121 is clamped in the groove 122 under a heavy deflection pressure by a washer 124 which is rounded at the inner edge to present a smooth surface to the rubber. An anchor ring 125 and a flange 126 on the inner end of a tube 127 extending concentrically along the bellows 118 are superimposed on the washer 124, and the assembly is clamped against the end wall of the counterbore 123 by a ring nut 128.

At the movable or outer end, the bellows 118 is provided with an internal flange 129 which is enlarged to form an annular rib or bead, and which is seated in an annular groove 130 formed in the end of the rod 115 inwardly of a shoulder 131 at the base of an axial stud 132. A circular piston head or disk 133 is secured against the shoulder 131 by a nut 134 on the stud 132, and serves to clamp the rubber flange in the groove 130 under a heavy deflection pressure. The outer lip of the groove 130 is struck outwardly in a metal upsetting process, and serves to confine the outer end of the wall against an encircling annular flange 135 on the disk 133.

Interposed between the bellows 118 and the tube 127 and nonrotatably anchored at the ends to the ring 125 and the flange 135 is a diametrically rigid and axially extensible and contractible reenforcement 136 similar to the reenforcement 110. The reenforcement 136 is held against buckling by the tube 127, and supports the bellows 118 against the internal liquid pressure to maintain a constant annular pressure area about the rod 115 and subject at all times through the grooves 120 to the pressure in the chamber 26.

The bellows head or disk 133 is removably held in a closely fitting circular recess 137 formed in the inner face of the end wall 138 of a cup-shaped member 139. This member has a cylindrical wall slidably telescoping with the outer end of the antibuckling tube 127, and serves as a guide for the outer end of the rod 115. The coiled tension spring 119 is anchored at opposite ends to the ring nut 128 and the member 139, and tends to urge the latter inwardly. Each anchor may be effected by threading the end coils into interlocking engagement. Inward movement of the member 139 is limited by the end of the tube 127. The spring 119 has a strength when contracted only slightly higher than necessary to overcome the sump pressure, and when expanded sufficient to balance the maximum brake pressure.

The pressure bellows 118 and associated parts just described are enclosed to exclude foreign matter and to prevent oxidation of the rubber and lubricant. The enclosure consists of a tube 140 bolted at one end to the unit body 25, and a rubber cup 141 telescoping with the outer end of the tube 140, and is clamped thereto at the rim.

When the brakes are released, the parts of the control unit 16 are positioned as illustrated in Fig. 3, the pressure valve 30 being closed, and the relief valve 31 being open. Upon actuating the foot pedal 17 to apply the brakes 13, the rod 79 is moved inwardly, thereby rocking the lever 74 in a counterclockwise direction through neutral position, in which both valves 30 and 31 are closed (see Fig. 5), into the position in which the relief valve 31 is closed and the pressure valve 30 is open. Brake liquid under pressure is now admitted to the control chamber 26, and from there passes to the various brake actuators 14 to apply the brakes. As the pressure in the control chamber 26 rises, the pressure control bellows 118 is elongated against the action of the tension spring 119, thereby moving the rod 115 and block 77 to the right to rock the lever 74 in a clockwise direction. The bellows head 133 seeks a position of balance in which the tappet lever 74 occupies a neutral position to close the pressure valve 30 and thereby prevent any further rise of pressure in the control chamber. The pressure at which this will occur depends on the position of the brake pedal 17, and increases as the pedal is progressively depressed. If the advancing movement of the pedal 17 has been limited to an amount just sufficient to open the pressure valve 30, the latter will be closed again after only a small pressure rise, and this pressure will be maintained on the brakes as long as the pedal is maintained in position. However, if the movement of the pedal 17 is continued, the pressure valve 30 will remain open, and the pressure in the control chamber 26, and in the brake actuators 14, will approach that of the pressure source or reservoir 22. The follow-up action permits application of the brakes with any desired pressure, and this pressure reacts on the pedal bellows 101 to impart a corresponding "feel" to the foot of the operator.

The action is reversed upon brake release. Upon return of the foot pedal, the lever 74 is rocked in a clockwise direction to open the relief valve 31 and permit the escape of the brake liquid. As the pressure drops, the bellows head 133 moves to the left, and tends to rock the bell crank in a counterclockwise direction to close the relief valve if the brake pedal 17 is only partially released. When the brake pedal is fully released, the bellows head 133 is limited against further inward movement by the tube 127 so that the relief valve 31 will remain open.

If the brake pedal 17 is depressed rapidly, the movable head 133 of the bellows 118 may not always respond to actuate the rod 115 at the same rate. In this event, the end of the rod 79 will strike the bottom of the bore 117 to transmit the excess pedal pressure directly to the spring 119, thereby preventing excessive strain on the bell crank lever 74. Whenever this happens, the "feel" of the pedal 17 will not correctly represent the pressure against the brakes, but this is due only to a momentary delay in the transmission of force and is immediately corrected. When the brade pedal 17 reaches the limit of forward movement as determined by engagement of the cup-shaped member 83, 84 with the end of the antibuckling tube 86, the "feel" of the pedal 17 will not represent the pressure on the brakes, but this condition will not arise under normal conditions, but only when it is necessary to slide the wheels.

The sump

The sump 20 (see Figs. 7, 8 and 10) has a chamber 142 which is automatically variable in size so as to be filled with liquid at all times, and which is under compression so as to maintain a low initial or residual pressure.

Figures 7, 8, 9, 10:
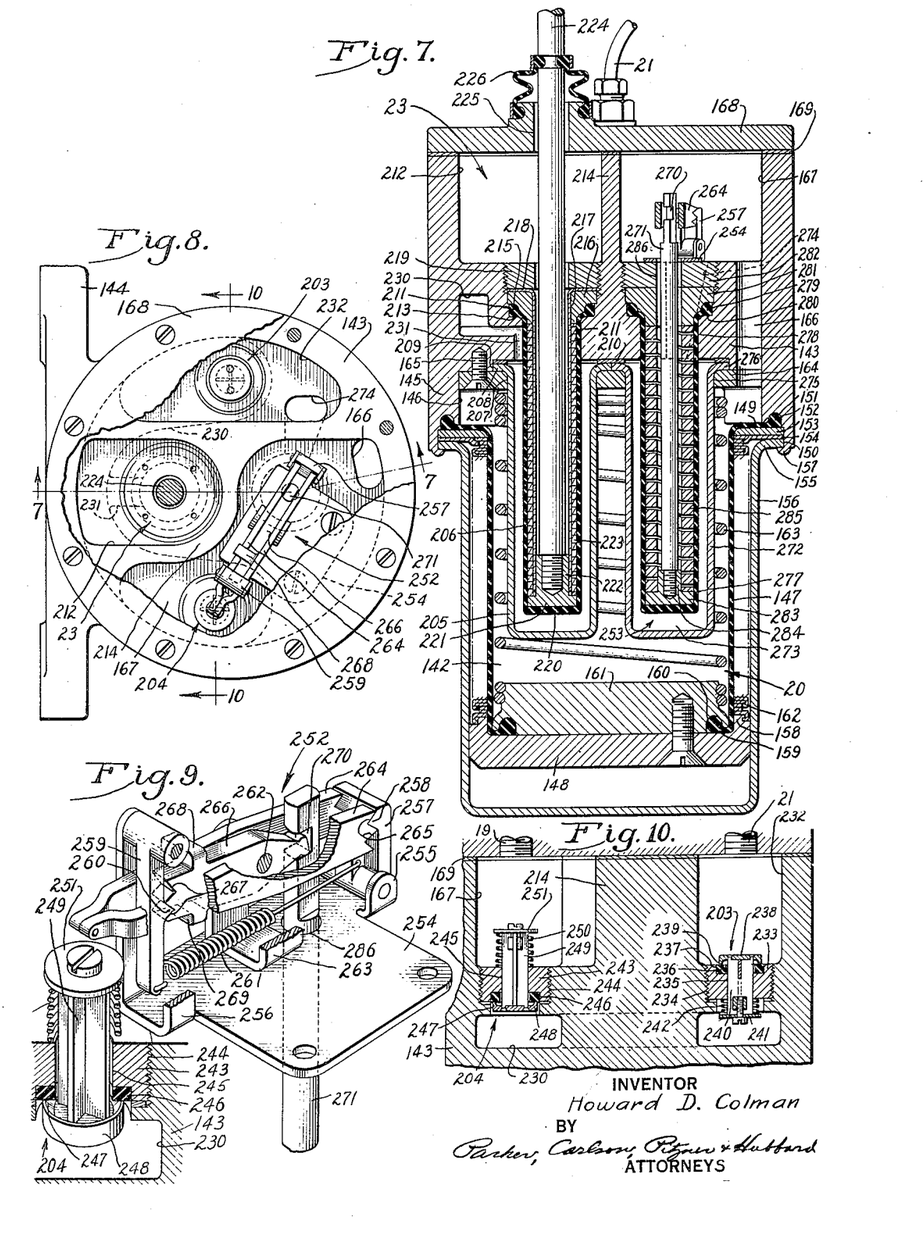
Fig. 7 is a fragmentary longitudinal sectional view of a combination sump and pump unit forming part of the system.
Fig. 8 is a fragmentary plan view of the sump and pump unit.
Fig. 9 is a perspective view of a device for controlling the operativeness of the pump.
Fig. 10 is a fragmentary sectional view taken substantially along line 10—10 of Fig. 8.

In its preferred form, the sump 20 comprises a body 143 having a mounting flange or bracket 144 adapted to be removably bolted to a support, such as the engine block 24 of the vehicle. The body 143 is generally cylindrical in shape, and is provided at one end with a projecting annular flange 145 defining a circular recess 146. A yieldable diaphragm, of a suitable material such as elastic rubber or rubber composition, and preferably in the form of a cylindrical axially extensible and contractible bellows wall 147, is connected at one end with a hermetic seal to the flange 145 and is closed at the other end with a rigid movable head 148. In the present instance, the inner end of the diaphragm or wall 147 is formed with a peripheral flange 149 disposed within an annular notch 150 in the inner peripheral edge of the outer end of the body flange 145. An outer perpheral rib or bead 151 on the rubber flange 149 is seated in an annular groove 152 formed in the radial wall of the notch 150. The bead 151 is clamped within the groove 152 under a heavy deflection pressure by an overlying annular disk 153 secured in position against the bottom of the notch 150. Superimposed against the disk 153 is an anchor ring 154 and an outer peripheral flange 155 on the rim of a cylindrical cup or housing 156. The assembly of the disk 153, ring 154 and cup flange 155 may be tightly secured within the notch 150 by any suitable means, as, for example, by riveting or upsetting the metal of the body flange 145 as indicated at 157.

The bellows head 148 is slidable in the housing 156, and has an annular peripheral flange 158 encircling the outer end of the bellows wall 147. An inner peripheral flange 159 on the bellows wall 147 is seated in an annular groove 160 in an inner disk 161. The flange 159 is thickened to form a rib or bead, and is clamped under deflection pressure by securing the disk 161 to the inside of the head 148. Disposed in the space between the bellows wall 147 and the housing 156, and nonrotatably anchored at opposite ends to the anchor ring 154 and the flange 158 is a reenforcement 162 of the same general character as the reenforcements 110 and 136. The reenforcement 162 is held against buckling by the housing 156, and serves to support the wall 147 against diametrical enlargement by the internal sump pressure.

A coiled tension spring 163 is anchored at opposite ends respectively to the body 143 and the inner disk 161, and tends to contract the bellows 147. To provide a suitable anchor, the inner end convolutions of the spring 163 are threaded in interlocking engagement into an annular plate 164 secured as by screw bolts 165 against the bottom of the recess 146, and centered by the flange 145. The other end convolutions of the spring 163 are threaded in interlocking engagement onto the inner disk 161.

The interior of the bellows 147 and the recess 146 define the sump chamber 142 which, as will be evident, is contractible by the spring 163 to maintain the desired liquid pressure, and which is expansible as required to receive the liquid discharged from the control unit 16 upon brake release. To establish communication with the control unit, the recess 146 opens through a passage 166 to a receiving chamber 167 of irregular shape formed in the opposite end of the body 143. The discharge end of the line 19 is connected to and opens through a cover plate 168 which is bolted to the body 143 and closes the receiving chamber 167. A gasket 169 is positioned between the body 143 and the cover plate 168 to provide a tight seal.

Pressure reservoir

Figures 11, 12:
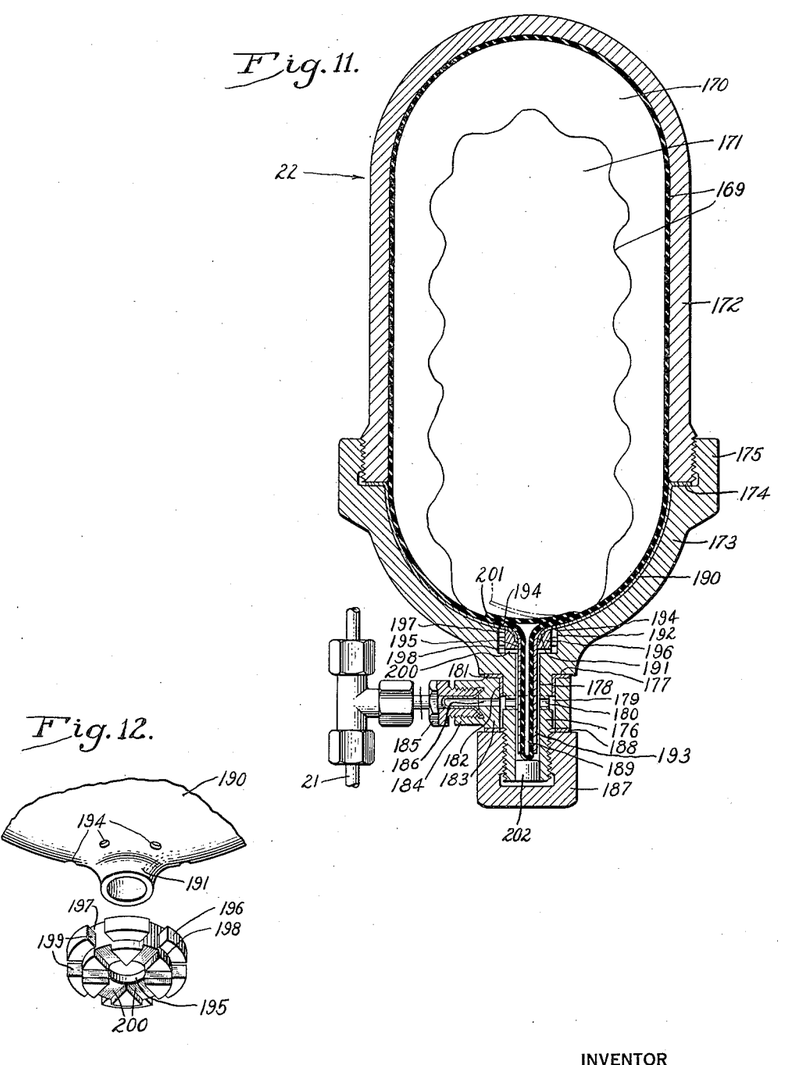
Fig. 11 is a vertical sectional view of a pressure reservoir forming part of the system.
Fig. 12 is a fragmentary perspective view illustrating certain parts of the reservoir in disassembled relationship.

The pressure fluid medium for operating the brakes 13 is supplied to the conduit or line 21 leading to the control unit 16 from the pressure reservoir 22 (see Figs. 11 and 12).

The reservoir 22 comprises a closed tank of a suitable rigid material, such, for example, as forged steel, substantially impervious to the passage of gases and liquids. A flexible partition or diaphragm 169 separates the interior of the tank into a chamber or space 170 adapted to receive the brake liquid, and a second chamber or space 171 containing a hermetically sealed body of gas under pressure. The diaphragm 169 also is made of a suitable material, such, for example, as rubber, substantially impervious to the passage of gases and liquids. The sealed body of gas is not in contact with the brake liquid and hence not subject to loss by escape or absorption, and being readily expansible, serves to maintain the liquid under pressure regardless of the degree to which the reservoir is filled.

The tank 22 may be provided in various forms, and preferably comprises two oppositely disposed cups 172 and 173 suitably connected together at the rims. A suitable gasket 174 is interposed between the cups 172 and 173 to provide a liquid-tight seal. The cup 172 constitutes a tubular reservoir body which is rounded or semi-spherical at the closed end. The other cup 173 is semi-spherical in form, and serves as a cover having an annular marginal flange 175 removably threaded onto the open end of the body 172.

The tank 22 is normally supported in a horizontal position, and has an integral stem 176 projecting from a flat annular shoulder 177 and formed with an axial bore 178 opening centrally through the cover 173. The stem 176 is formed intermediate its ends with an external peripheral groove 179 and a plurality of radial ports 180 opening therefrom to the bore 178. A gasket 181 with a central sleeve 182 is slidably disposed on the stem 176 immediately above the groove 179 and against the shoulder 177. Positioned on the sleeve 182 and against the gasket 181, and freely encircling the stem 176 in the region of the groove 179 is a tubular line connecter or fitting 183 with an internally threaded boss 184 on one side. A branch end of the liquid inlet and discharge line 21 is removably secured in the boss 184 with a liquid-tight seal by a gland nut 185, and opens through a port 186 to the interior of the fitting 183 for communication with the groove 179. The fitting 183 is pressed tightly against the gasket 181 by a cap nut 187 threaded onto the free end of the stem 176. Interposed between the fitting 183 and the nut 187 is a gasket 188. It will be understood that the gaskets 181 and 188 provide a liquid-tight seal in the connection between the stem 176 and the fitting 183.

The partition or diaphragm 169 preferably is provided in the form of a sealed rubber bag disposed substantially entirely within the tank 22 and having a sealed filling stem 189 projecting into the bore 178. The space between the inner surface of the tank 22 and the exterior of the bag 169 constitutes the liquid chamber 170, and the interior of the bag defines the gas chamber 171. The bag has a free form of such size and shape that it will fit loosely within the tank 22, but upon the application of a slight amount of internal pressure will stretch readily to press against the inner walls of the tank, assuming the latter to be empty of liquid. Since the gas is not in direct contact with the wall of the tank 22 but is confined in the bag 169 immersed in the brake liquid, it cannot leak out by permeation through the pores of the metal. Also, it will have little or no tendency to permeate through the wall of the bag 169 since the opposite sides of the wall are normally subjected to equal pressures. Consequently, the reservoir will hold the gas under a heavy pressure without leakage or objectionable pressure loss for a long period of time, running into years.

Seated in and conforming to the interior of the cover 173 is a semi-spherical cup 190 which preferably is integral with the gasket 174, and which at the center is pierced and drawn into a short flared boss 191 projecting into a counterbore 192 at the inner end of the bore 178. An elongated tube 193 extends through the boss 191 with a fit sufficiently close to effect a mechanical connection but not necessarily liquid-tight, and projects therefrom in concentrically spaced relation into the bore 178 to receive the filling stem 189. The upper end portion of the tube 193 is flared to interfit with the inner surface of the boss 191, and the wall thereof is gradually tapered to merge with the inner surface of the cup 190 so as to present a smooth surface to the bag 169. It will be understood that the tube 193 serves to prevent the stem 189 from being inflated into engagement with the wall of the bore 178 which if permitted would close the liquid passage through the bore and at the ports 180.

The liner cup 190 is formed with a plurality of small ports 194 which open about the boss 191 to the counterbore 192 so as to maintain unrestricted communication between the interior of the tank 22 and the bore 178 about the tube 193. The holes or ports 194 are sufficiently small in relation to the thickness of the wall of the bag 169 to prevent the gas pressure from forcing entry of the rubber therein to an objectionable extent. Snugly seated in the counterbore 192 and having a central flared aperture 195 receiving and interfitting with the boss 191 is a disk 196 defining a plurality of passages for connecting the ports 194 to the bore 178. In the present instance, the disk 196 is formed with annular notches 197 and 198 in its outer edges, with peripherally spaced grooves 199 as by hobbing connecting the notches, and with radial grooves 200 in the lower face opening from the notch 198 to the aperture 195 for communication with the upper end of the bore 178.

In the assembly operation, the rubber bag 169 is inflated through the stem 189 with a suitable gas under a pressure sufficient to give the required minimum or residual pressure when the tank 22 is empty of liquid. At this time, the stem 189 is unsealed and projects out of the bore 178 for attachment to a suitable source of gas (not shown). After the bag 169 is filled, the rubber stem 189, while being stretched and clamped temporarily, is vulcanized at the end of the stem 176 to seal in the gas, and then the excess length beyond the seal is cut off. A flap 201 within the bag 169 temporarily closes the inner end of the stem 189 during the sealing operation. The sealed stem 189 is of such length that, in its uninflated or free form, the end would reach the nut 187. When inflated, the stem 189 will tend to become somewhat elongated, but will be held in position by a plug 202 in the outer end of the bore 178.

Upon inflation of the bag 169, substantially all of the air in the tank 22 will be removed. A small amount of air may remain initially in the bore 178 about the tube 193 and in the passages of the disk 196, but this air can be readily removed by evacuation and replaced by liquid.

The assembly being completed, brake liquid may be supplied from a suitable source under pressure through the line 21. When the pressure in the line 21 rises above the residual gas pressure, liquid will flow into the chamber 170, and will compress the gas to collapse the bag 169 progressively as required. Except when the tank 22 is empty, the bag 169 is immersed in the liquid, and subjected to substantially the same pressure at the inside and outside, so that there is no tendency of the gas molecules to escape through the walls of the bag.

The pump

Brake liquid is supplied to the pressure reservoir 22 by the pump 23 as required to maintain a predetermined available pressure. Preferably, the sump 20 and the pump 23 are embodied in a unitary structure (see Figs. 7 to 10). Generally, the pump 23 has an inlet or suction valve 204 opening from the sump 20 and a pressure discharge valve 203 opening to the line 21 leading to the reservoir 22, and is adapted to be rendered operable and inoperable by pressure responsive means when the pressure respectively falls below a predetermined minimum, and rises to a predetermined maximum.

The pump 23, in its preferred form, comprises a cylinder 205 and an axially contractible and extensible bellows piston 206 reciprocable therein to vary the volume of the fluid space. The cylinder 205 consists of a cylindrical cup, the closed end of which projects into the sump chamber 142, and the other end of which is suitably anchored to the body 143. In the present instance, the open end of the cup 205 extends snugly through a circular opening 207 in the plate 164, and is formed with an outer peripheral flange 208 confined by the latter against the bottom of a shallow circular recess 209 formed in the bottom wall of the recess 146. A suitable gasket 210 is interposed between the flange 208 and the bottom of the recess 209 to provide a tight seal.

The bellows piston 206 consists of a rubber cup having an elongated cylindrical wall anchored at one end in the body 143 and extending at the outer end into spaced concentric relation into the cylinder 205. To provide a suitable anchor for the piston 206, a bore 211 is formed in the body 143 to open from a chamber 212, closed by the cover 168 and separated from the chamber 167 by a partition 214, to the interior of the cylinder 205, and is enlarged at the outer end to define an annular shoulder 213. The fixed end of the bellows piston 206 extends snugly through the inner end portion of the bore 211, and is formed with a thickened outer peripheral flange 215 seated against the shoulder 213. Positioned against the flange 215 in the enlarged outer end of the bore 211 is an annular ring 216. A tube 217 extends through the ring 216 and in concentrically spaced relation into the bellows piston 206, and has a peripheral mounting flange 218 seated on the ring 216. A ring nut 219 is removably threaded into the outer end of the bore 211 against the flange 218, and serves to hold the parts in assembled relation, with the rubber flange under a heavy deflection pressure, and the tube 217 clamped in position.

The movable end of the bellows piston 206 is closed by a wall 220, and seated against the interior thereof is a circular head 221 having an axial stem 222 telescoping with the free end of the tube 217. A square wire coil spring 223 encircles the tube 217 and abuts at opposite ends against the ring 216 and the head 221. The spring 223 is held against buckling by the tube 217 and serves to reenforce the peripheral wall of the bellows piston 206 against diametrical contraction by the external liquid pressure so as to maintain a substantially constant piston area. It will be evident that the bellows piston 206 is of constant diameter, and is axially extensible and contractible. To reduce heating due to internal molecular friction, both the bellows piston 206 and the spring 223 are of substantial length in relation to the extent of the piston movement.

To provide means for actuating the piston, a rod 224 is threaded at one end into the stem 222, and extends from the tube 217 through the nut 219, the chamber 212 and an opening 225 in the cover plate 168 for a power drive. A bellows 226, connected at opposite ends to the cover plate 168 and the rod 224, provides a seal for the opening 225. Preferably, the spring 223 is of the compression type, and the piston rod 224 (see Fig. 1) is reciprocable by a strap eccentric 227 driven through gearing 228 from the cam shaft 229 of the engine 24.

Formed in the body 143 is an arcuate valve chamber 230 which is connected intermediate its ends through a passage 231 to the interior of the cylinder 205. The pressure or discharge valve 203 opens from one end of the chamber 230 to a pressure chamber 232 formed in the end of the body 143 and closed by the cover 168 for connection to the line 21, and the suction valve 204 opens from the chamber 167 to the other end of the chamber 230.

In the present instance, the pressure valve 203 comprises a nut 233 threaded for convenient removal into a bore 234 connecting the chambers 230 and 232, and formed with a central valve passage 235. A rubber ring or insert 236 is fitted into an annular notch 237 in the outer end edge of the passage 235, and defines a resilient valve seat. Engageable with the seat 236 is a valve member in the form of a disk 238 having an annular flange 239 defining a valve face, and having an axial stem 240 extending reciprocably through the passage 235. Preferably, the stem 240 consists of perpendicular plates with interfitting slots and riveted at one end to the disk 238. A disk 241 is removably secured to the other end of the stem 240, and serves as a seat for a coil compression spring 242 engaging the nut 233 and tending to close the valve 203 against the pump discharge.

The suction or intake valve 204 is similarly constructed. Thus, it comprises a nut 243 threaded into the outer enlarged end of a bore 244 connecting the chambers 167 and 230, and formed with a central valve passage 245. A resilient valve seat 246 is fitted in the inner face of the nut 243, and is engageable by an annular flange 247 on a disk 248 having a stem 249 extending reciprocably through the passage 245. A coiled compression spring 250 acting at opposite ends against the nut 243 and a disk 251 removably secured to the outer end of the stem 249 tends to close the valve 204 against the pump suction.

The pump is adapted to be rendered inoperable by automatically holding the intake valve 204 open. In the present instance, the means for this purpose comprises an over-center device 252 (see Figs. 8 and 9) operable by a pressure responsive device 253 subject to the pressure in the discharge line 21 of the pump.

The over-center device 252 comprises a base plate 254 removably bolted to the floor of the chamber 167, and formed with upstanding brackets 255 and 256. Pivotally mounted on these brackets respectively are an upstanding pawl 257 with a tooth 258, and a depending pawl 259 with a tooth 260. A coil tension spring 261 tends to urge the pawls 257 and 259 toward each other. Pivotally mounted intermediate its ends, as by a pin 262 on an auxiliary bracket 263 on the base plate 254 is a forked operating lever 264 which extends at one end over the valve stem 249 in position when lowered to depress the latter, and which is formed at the other end in each fork with two pawl serrations 265 adapted for selective engagement with the pawl tooth 258. A second operating lever 266 is pivotally mounted intermediate its ends on the pin 262. One end of the lever 266 has two pawl serrations 267 adapted for selective engagement with the pawl tooth 260, and is also formed with laterally projecting lugs 268 and 269 overlying and underlying the lever 264. The other end of the lever 266 engages in a transverse notch 270 formed in an actuating rod 271 between the forks of the lever 264.

The rod 271 is operable by the pressure responsive device 253 which in the preferred form comprises a closed cup 272 projecting into the sump chamber 142 alongside the cup 205 and defining an internal pressure chamber 273 opening through a passage 274 to the chamber 232. The upper end of the cup 272 extends through an opening 275 in the plate 164, and has a flange 276 held by the latter against the gasket 210.

Disposed within the cup 272 is a pressure responsive piston element in the form of a cylindrical rubber bellows or cup 277. One end of the bellows 277 is closed and movable, and the other end is fixed to the body 143. In the present instance, the fixed end of the bellows 277 extends into a bore 278 opening through the body 143 to the chamber 167 and has a thickened peripheral flange 279 clamped under a heavy deflection pressure against a shoulder 280 in the bore by a ring 281. A ring nut 282, threaded into the enlarged outer end of the bore 278, serves to hold the ring 281 in place. To maintain a constant axial pressure area, a disk 283 with a central stem 284 is disposed against the inside of the movable end wall of the bellows 277, and a coiled compression spring 285 engages at opposite ends against the disk 283 and ring 281 and affords a reenforcement for the peripheral wall against diametrical displacement by the external pressure. The actuating rod 271 for the over-center device 252 extends freely through an opening 286 in the base plate 254, the nut 282, ring 281 and spring 285 into the bellows 277 and is threaded into the stem 284 for axial movement therewith.

Fig. 9 illustrates the pump in operative condition. As the discharge pressure rises, the bellows 277 will be longitudinally compressed, and the rod 271 will be lifted accordingly. Upon reaching a predetermined maximum pressure, the rod 271 will be shifted sufficiently to snap the lever 266 downwardly to bring the uppermost serration 267 into engagement with the pawl tooth 260. As a result, the lug 268 will move the operative end of the lever 264 downwardly until the lowermost serration 265 engages the pawl tooth 258, thereby opening the valve 204 and maintaining it in open position.

Upon a decrease in pressure below a predetermined minimum, the spring 285 will lower the rod 271 sufficiently to reverse the operation of the over-center device 252. Thus, the lever 266 will lift the lever 264 against the action of the spring actuated pawls 257 and 259 past the tooth 258 to release the valve 204.

*Résumé*

It will be evident that I have provided a new and improved hydraulic power brake in which the pressure of brake application is under the control of the foot pedal 17, and in which a "feel" is imparted to the operator proportional to the pressure. The brake is easily assembled and disassembled, the fastening means for the various component elements being readily accessible. All of the movable operating parts exposed to the brake liquid are hermetically sealed to prevent leakage and the infiltration of air.

I claim as my invention:

1. A hydraulic power brake comprising, in combination, a hermetically sealed liquid pressure reservoir containing a pressure maintaining body of gas out of direct contact with the liquid, a hermetically sealed liquid sump for maintaining a reserve quantity of liquid under a low initial pressure, a hermetically sealed power driven pump having a suction line with an inlet check valve opening from said sump and having a delivery line with an outlet check valve leading to said reservoir, means including a hermetically sealed element responsive to the delivery pressure for said pump for automatically holding said inlet check valve open when said delivery pressure attains a predetermined maximum and for releasing said inlet check valve when said delivery pressure drops to a predetermined minimum, a hermetically sealed control unit having a distributing chamber with a pressure valve opening from said delivery line and a release valve opening to said sump, a hermetically sealed brake actuator connected to said chamber, a compound valve actuator in said chamber and movable out of release position to close said release valve and open said pressure valve, a manual element for operating said valve actuator, a hermetically sealed pressure responsive reaction element exposed to the pressure in said chamber and acting on said manual element to resist movement thereof out of release position with a force proportional to the liquid pressure, and a hermetically sealed pressure responsive control element exposed to the pressure in said chamber and tending to adjust said valve actuator independently of said manual element to close said pressure valve at a predetermined brake pressure corresponding to the extent of movement of said manual element out of release position.

2. A hydraulic power brake comprising, in combination, a hermetically sealed liquid pressure reservoir, a hermetically sealed liquid sump for maintaining a reserve quantity of liquid, a hermetically sealed power driven pump having a suction line opening from said sump and having a delivery line leading to said reservoir, means for controlling the delivery of said pump to maintain a predetermined pressure range in said reservoir, a hermetically sealed control unit having a distributing chamber with a pressure inlet valve opening from said delivery line and a release valve opening to said sump, a hermetically sealed brake actuator connected to said chamber, a compound valve actuator in said chamber and movable out of release position to close said release valve and open said pressure valve, a manual element for operating said valve actuator, a hermetically sealed pressure responsive reaction element exposed to the pressure in said chamber and acting on said manual element to resist movement thereof out of release position with a force proportional to the liquid pressure, and a hermetically sealed pressure responsive control element exposed to the pressure in said chamber and tending to adjust said valve actuator independently of said manual element to close said pressure valve at a predetermined brake pressure corresponding to the extent of movement of said manual element out of release position.

3. A hydraulic power brake comprising, in combination, a brake actuator, a sump, a pressure reservoir, a pump having an inlet line opening from said sump and a delivery line opening to said reservoir and having valve means for controlling said lines, a control unit connected to said actuator and having a supply line opening from said reservoir and an outlet line opening to said sump and having control valve means for controlling said supply and outlet lines, manual means for actuating said control valve means to close said outlet line and open said supply line for brake application and to close said supply line and open said outlet line for brake release, and pressure responsive means automatically operable on brake application to actuate said control valve means independently of said manual means so as to effect the closing of both said supply and outlet lines when the braking pressure attains a predetermined value corresponding with the position of said manual means.

4. A hydraulic power brake comprising, in combination, a brake actuator, a sump, a pressure reservoir, a pump having an inlet line opening from said sump and a delivery line opening to said reservoir and having valve means for controlling said lines, a control unit connected to said actuator and having a supply line including a pressure valve opening from said reservoir and an outlet line including an exhaust valve opening to said sump, manual means for actuating said valves to close said outlet line and open said supply line for brake application and to close said supply line and open said outlet line for brake release, and pressure responsive means automatically operable on brake application to actuate said valves independently of said manual means so as to effect the closing of both valves when the braking pressure attains a predetermined value corresponding with the position of said manual means.

5. A hydraulic power brake comprising, in combination, a liquid pressure reservoir, a liquid sump for maintaining a reserve quantity of liquid, a power driven pump having a suction line opening from said sump and having a delivery line leading to said reservoir, means for controlling the delivery of said pump to maintain a predetermined pressure range in said reservoir, a control unit having a distributing chamber with a pressure inlet valve opening from said delivery line and a release valve opening to said sump, a brake actuator connected to said chamber, a compound valve actuator in said chamber and movable out of release position to close said release valve and open said pressure valve, a manual element for operating said valve actuator, a pressure responsive reaction element exposed to the pressure in said chamber and acting on said manual element to resist movement thereof out of release position with a force proportional to the liquid pressure, and a pressure responsive control element exposed to the pressure in said chamber and tending to adjust said valve actuator independently of said manual element to close said pressure valve at a predetermined brake pressure corresponding to the extent of movement of said manual element out of release position.

6. A hydraulic power brake comprising, in combination, a hermetically sealed brake actuator, a hermetically sealed sump, a hermetically sealed pressure reservoir, a hermetically sealed pump having an inlet line opening from said sump and a delivery line opening to said reservoir and having valve means for controlling said lines, a hermetically sealed control unit connected to said actuator and having a supply line including a pressure valve opening from said reservoir and an outlet line including an exhaust valve opening to said sump, manual means for actuating said valves to close said outlet line and open said supply line for brake application and to close said supply line and open said outlet line for brake release, and a hermetically sealed pressure responsive means automatically operable on brake application to actuate said valves independently of said manual means so as to effect the closing of both valves when the braking pressure attains a predetermined value corresponding with the position of said manual means.

7. A hydraulic power brake comprising, in combination, a liquid pressure reservoir containing a pressure maintaining body of gas out of direct contact with the liquid, a liquid sump for maintaining a reserve quantity of liquid under a low initial pressure, a power driven pump having a suction line with an inlet check valve opening from said sump and having a delivery line with an outlet check valve leading to said reservoir, means including an element responsive to the delivery pressure for said pump for automatically holding said inlet check valve open when said delivery pressure attains a predetermined maximum and for releasing said inlet check valve when said delivery pressure drops to a predetermined minimum, a control unit having a distributing chamber with a pressure valve opening from said delivery line and a release valve opening to said sump, a brake actuator connected to said chamber, and means for actuating said control unit, said means being operable in one direction to open said pressure valve and to close said release valve and in the other direction to close said pressure valve and to open said release valve.

HOWARD D. COLMAN.

CERTIFICATE OF CORRECTION.

Patent No. 2,246,667.　　　　　　　　　　　　　　　　　　　　June 24, 1941.

HOWARD D. COLMAN.

It is hereby certified that error appears in the above numbered patent requiring correction as follows: In the grant, lines 1 and 13, and in the heading to the printed specification, line 3, name of inventor, for "Howard D. Coleman" read --Howard D. Colman--; page 9, second column, lines 14 and 15, claim 6, strike out the syllable and words "tor, a hermetically sealed sump, a hermetically sealed pressure reservoir, a hermetically sealed" and insert the same before "pump" in line 11, same claim; and that the said Letters Patent should be read with this correction therein that the same may conform to the record of the case in the Patent Office.

Signed and sealed this 30th day of September, A. D. 1941.

(Seal)　　　　　　　　　　　　　　　　　　　　　　　Henry Van Arsdale,
　　　　　　　　　　　　　　　　　　　　　　　Acting Commissioner of Patents.